(12) United States Patent
Lin

(10) Patent No.: US 6,441,674 B1
(45) Date of Patent: Aug. 27, 2002

(54) METHOD AND APPARATUS FOR TEMPERATURE MEASUREMENT WITH VOLTAGE VARIATION OFFSET

(75) Inventor: Chuen-Min Lin, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/933,202

(22) Filed: Aug. 21, 2001

(30) Foreign Application Priority Data

Jun. 29, 2001 (TW) ........................................ 90115873 A

(51) Int. Cl.[7] .............................................. H01L 35/00
(52) U.S. Cl. ........................................ 327/512; 327/78
(58) Field of Search ............................... 327/83, 68, 78, 327/307, 512, 513, 539; 341/119; 374/170, 171, 163, 112, 113, 114, 183, 185; 307/308, 324

(56) References Cited

U.S. PATENT DOCUMENTS

| | | | | |
|---|---|---|---|---|
| 4,505,600 A | * | 3/1985 | Suzuki et al. ............... | 374/170 |
| 5,336,943 A | * | 8/1994 | Kelly et al. ................. | 327/513 |
| 5,422,832 A | * | 6/1995 | Moyal .......................... | 327/512 |
| 5,629,611 A | * | 5/1997 | McIntyre ..................... | 323/313 |
| 6,075,407 A | * | 6/2000 | Doyle .......................... | 327/539 |
| 6,094,092 A | * | 7/2000 | Mizuno et al. ............. | 327/513 |
| 6,172,555 B1 | * | 1/2001 | Gusinov ...................... | 327/539 |
| 6,181,192 B1 | * | 1/2001 | Tohyama et al. ........... | 327/513 |

* cited by examiner

Primary Examiner—Terry D. Cunningham
Assistant Examiner—Long Nguyen
(74) Attorney, Agent, or Firm—Rabin & Berdo, P.C.

(57) ABSTRACT

A method for temperature measurement with voltage variation offset implemented by comparing a sensing voltage with a reference voltage, wherein the sensing voltage and the reference voltage synchronously vary with a power supply, whereby the voltage variation between the sensing voltage and the reference voltage is obviated. An apparatus for temperature measurement includes a thermal detecting element, a sensing voltage dividing circuit connected between the thermal detecting element and the power supply, a reference voltage dividing circuit connected to the power supply, and a comparator connected to the sensing voltage dividing circuit and the reference voltage dividing circuit.

7 Claims, 1 Drawing Sheet

METHOD AND APPARATUS FOR TEMPERATURE MEASUREMENT WITH VOLTAGE VARIATION OFFSET

BACKGROUND OF THE INVENTION

1. Field of the Invention

The present invention relates to a method and an apparatus for temperature measurement, and more particularly to a method and an apparatus with voltage variation offset function so as to avoid a temperature measurement error caused by voltage variation.

2. Description of Related Art

Now, bipolar junction transistors (BJT) or diodes are most widely applied for thermal measurement of peripheral devices of a computer, such as a central processing unit (CPU). Since the voltage versus temperature relationship between the base and emitter of the BJT or between the cathode and the anode of the diodes is in inverse proportion, the temperature is easy to be obtained by detecting the voltage between the base and the emitter of the BJT, or the voltage between the cathode and the anode of the diode.

With reference to FIG. 2, a transistor with a base connected to a collector is equivalent to a diode. Such a transistor is used as a thermal detecting element (30). The thermal detecting element (30) obtains a current from a power supply Vref through a resistor R3, and then the thermal detecting element (30) provides a sensing voltage Vb to a comparator (40). The comparator (40) further receives a reference voltage Va from a voltage dividing circuit (10) composed of resistors R1 and R2. The comparator (40) compares the sensing voltage Vb with the reference voltage Va so as to obtain a difference value that is further amplified by an amplifier (50). Then the amplifier (50) outputs and transfers an analog signal and to an A/D converter (not shown) so as to find out the temperature.

For example, if the temperature coefficient of the thermal detecting element (30) is $-2.2$ mV/° C., it means there will be a $-2.2$ millivolts voltage drop generated when temperature increases by one degree Centigrade, and the temperature variation is easily obtained by detecting the sensing voltage variation.

However, once the power supply Vref has variation, it will lead the reference voltage Va to encounter voltage floating (voltage variation), and thus the temperature measurement also has variation and cannot be precisely detected.

For example, the power supply Vref is 3.6 volts, the resistance of the resistors R1, R2 and R3 are respectively 4 KΩ, 1 KΩ and 10 KΩ, and the sensing voltage Vb is 0.7 volts:

(1) If the voltage variation (ΔV) at the power supply is 0 volts, the voltage difference value between two input terminals of the comparator (40) is equal to $$3.6 \times (1/1+4) - 0.7 = 0.02 \text{ volts}$$

(2) If the voltage variation (ΔV) at the power supply is 60 millivolts, the voltage difference value between two input terminals of the comparator (40) is equal to $$3.66 \times (1/1+4) - 0.7 = 0.032 \text{ volts (the temperature error is 6 degrees Centigrade)}$$

(3) If the voltage variation (ΔV) at the power supply is 100 millivolts, the voltage difference value between two input terminals of the comparator (40) is equal to $$3.7 \times (1/1+4) - 0.7 = 0.032 \text{ volt (the temperature error is 10 degrees Centigrade).}$$

From the foregoing examples, it is easy to understand that even when the voltage variation is only 0.06 volts, the temperature error reaches 6 degrees Centigrade. If the voltage variation is 0.1 volts, the temperature error reaches 10 degrees Centigrade.

Therefore, the invention provides a method and apparatus for temperature measurement with voltage variation offset to mitigate and/or obviate the aforementioned problems.

SUMMARY OF THE INVENTION

The main objective of the invention is to provide a method and apparatus for temperature measurement with voltage variation offset to effectively mitigate or obviate the measurement error caused by voltage variation.

The second objective of the invention is to provide a method and apparatus for temperature measurement with voltage variation offset by adding a few elements to achieve the voltage variation offset.

To achieve these objectives of the invention, the sensing voltage is set to have variation to counterbalance the power supply variation, wherein the variation of the sensing voltage is generated based on the power supply, wthus hereby the temperature measurement error is can be obviated.

In the real circuit layout of the invention, a voltage dividing circuit composed of resistors is applied to connect to an input of a thermal detecting element in series, and the sensing voltage is taken from an output of the voltage dividing circuit, whereby the sensing voltage is also varied based on the power supply variation.

The method for temperature measurement in accordance with the present invention comprises the steps of:

applying a thermal detecting element to sense temperature;

applying a voltage dividing circuit connected between a power supply and the thermal detecting element to obtain a current;

taking a sensing voltage from the voltage dividing circuit, wherein the sensing voltage varies based on the power supply variation;

taking a reference voltage from a reference voltage dividing circuit that is connected to the power supply;

comparing the sensing voltage with the reference voltage in a comparator; and amplifying an output voltage from the comparator.

Since the sensing voltage is synchronously varied based on the power supply variation, the temperature measurement error can be obviated.

Other objects, advantages and novel features of the invention will become more apparent from the following detailed description when taken in conjunction with the accompanying drawings.

DETAILED DESCRIPTION OF THE PREFERRED EMBODIMENT

Figure 1:
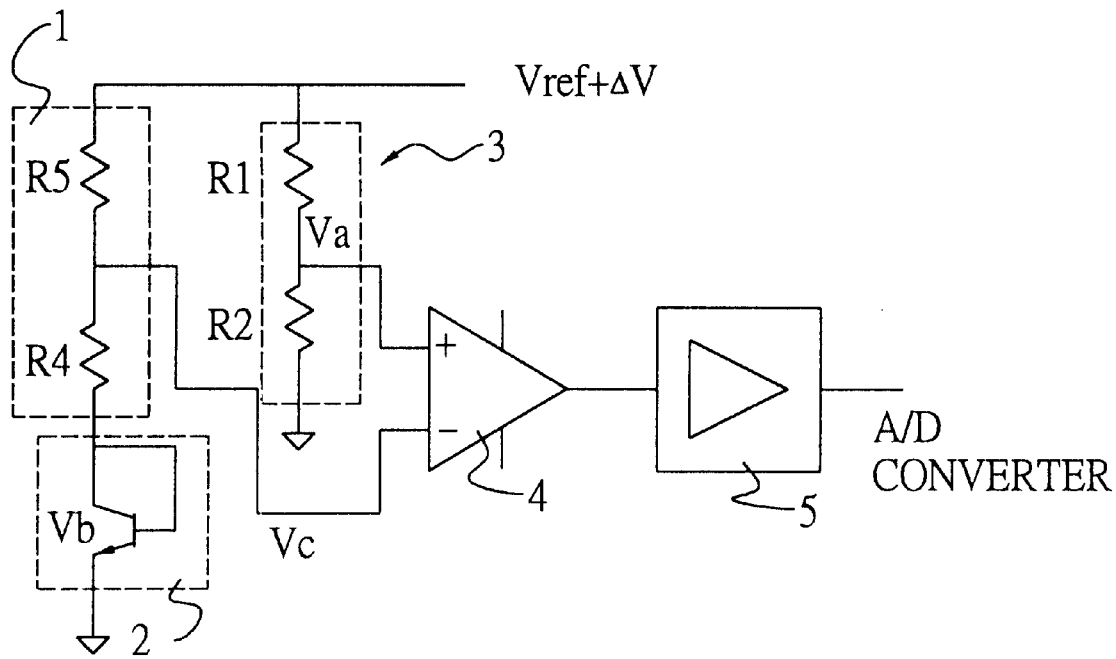
FIG. 1 is a circuit layout diagram of a temperature measurement apparatus in accordance with the present invention.
Figure 2:
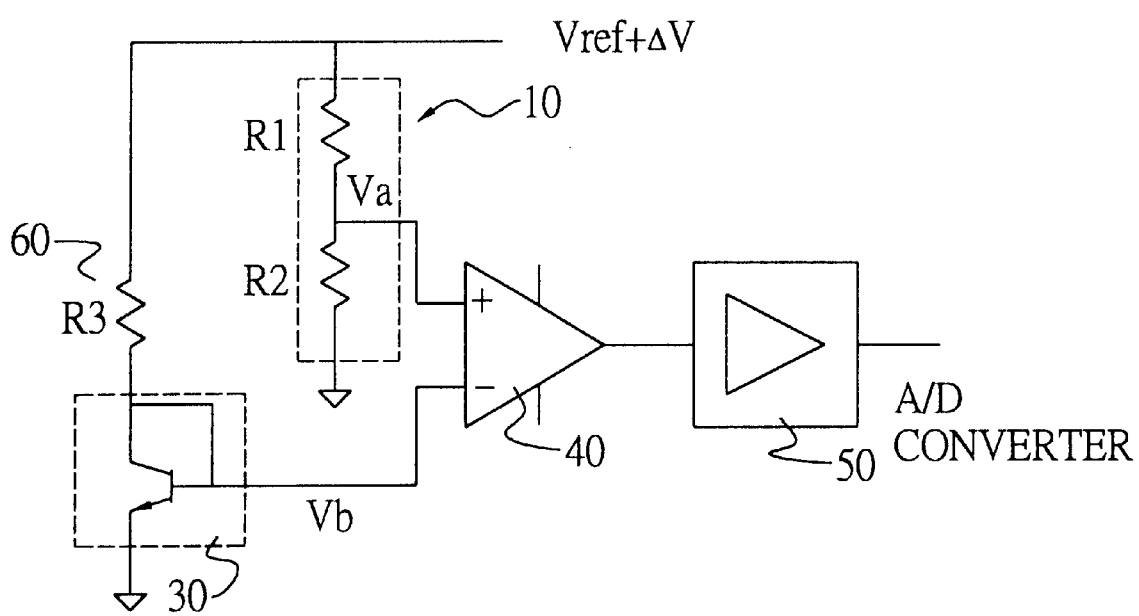
FIG. 2 is a conventional circuit layout diagram of a temperature measurement apparatus.

As shown by a circuit layout diagram of FIG. 1, a temperature measurement apparatus comprises a sensing voltage dividing circuit (1) composed of resistors R4 and R5, a thermal detecting element (2), a reference voltage dividing circuit (3) composed of resistors R1 and R2, a comparator (4) and an amplifier (5). The thermal detecting element (2) is connected to a power supply Vref through the sensing voltage dividing circuit (1), wherein the thermal detecting element (2) is applied to sense temperature of an electronic element, such as a central processing unit (CPU) in a computer. The comparator (4) has two input terminals respectively connected to the sensing voltage dividing circuit (1) and the reference voltage dividing circuit (3) to receive a sensing voltage Vc and a reference voltage Va, wherein the reference voltage dividing circuit is further connected to the power supply Vref. An output of the comparator (4) is connected to the amplifier (5).

Since the sensing voltage Vc is taken from the sensing voltage dividing circuit (1), once the power supply Vref has voltage variation, the sensing voltage Vc also varies synchronously. Simultaneously, the reference voltage Va also varies, which means the sensing voltage Vc and the reference voltage Va are changed synchronously. If the resistance values of the resistors in the sensing voltage dividing circuit (1) and the reference voltage dividing circuit (3) are properly chosen, the voltage variation in the inputs of the comparator caused by power supply variation (40) can be obviated.

For example, if the power supply voltage Vref is chosen as 3.6 volts, the resistances of both resistors R1 and R5 are 4 KΩ, and the resistances of both resistors R2 and R4 are 1 KΩ, and the voltage between base and emitter of the thermal detecting element (2) is 0.7 volts:

(1) If the voltage variation (ΔV) at the power supply is 0 volts, the voltage difference value between two input terminals of the comparator (4) is equal to $$3.6 \times (1/1+4) - [(3.6-0.7) \times (1/1+4) + 0.7] = -0.56 \text{ volts.}$$

(2) If the voltage variation (ΔV) at the power supply is 60 millivolts, the voltage difference value between two input terminals of the comparator (4) is equal to $$3.66 \times (1/1+4) - [(3.66-0.7) \times (1/1+4) + 0.7] = -0.56 \text{ volts.}$$

(3) If the voltage variation (ΔV) at the power supply is 100 millivolts, the voltage difference value between two input terminals of the comparator (4) is equal to $$3.7 \times (1/1+4) - [(3.7-0.7) \times (1/1+4) + 0.7] = -0.56 \text{ volts.}$$

The output signal from the comparator is further transferred into an analog/digital converter and is converted into a digital signal, wherein the digital signal stands for the temperature value.

From the above description, even when the power supply has different voltage variation values, the voltage difference value between two input terminals of the comparator (4) still remains at a constant value, and no voltage variation occurs at the input terminals of the comparator (4). In this embodiment, the resistance value ratio of the resistor R1 to the resistor R2 is 4:1, which is the same as the ratio of the resistor R5 to the resistor R4.

Although the present invention has been explained in relation to its preferred embodiment, it is to be understood that many other possible modifications and variations can be made without departing from the spirit and scope of the invention as hereinafter claimed.

What is claimed is:

1. A method for temperature measurement with voltage variation offset, the method comprising the steps of:

applying a thermal detecting element adapted to sense temperature of an electronic element;

applying a sensing voltage dividing circuit coupled between a power supply and the thermal detecting element to obtain a current;

obtaining a sensing voltage from the sensing voltage dividing circuit, wherein the sensing voltage varies based on voltage variation of the power supply;

obtaining a reference voltage from a reference voltage dividing circuit connected to the power supply; and comparing the sensing voltage with the reference voltage in a comparator to obtain an analog signal, wherein the analog signal is further converted into a digital signal by an A/D converter.

2. An apparatus for temperature measurement with voltage variation offset, the apparatus comprising:

a thermal detecting element;

a sensing voltage dividing circuit connected between the thermal detecting element and a power supply to provide a current to the thermal detecting element, wherein the sensing voltage dividing circuit is composed of a first resistor and a second resistor, and a sensing voltage is obtained from the sensing voltage dividing circuit;

a reference voltage dividing circuit connected to the power supply to provide a reference voltage, wherein the reference voltage dividing circuit is composed of a third resistor and a fourth resistor; and a comparator comparing the sensing voltage with the reference voltage to obtain an analog signal, wherein the analog signal is further transferred into an analog/digital converter and is converted into a digital signal that represents a temperature value.

3. The apparatus as claimed in claim 2, wherein the thermal detecting element is a transistor.

4. The apparatus as claimed in claim 2, wherein the thermal detecting element is a diode.

5. The apparatus as claimed in claim 3, wherein the thermal detecting element is a diode.

6. The apparatus as claimed in claim 2, wherein a resistance value ratio of the first resistor to the third resistor is the same as a resistance value ratio of the second resistor to the fourth resistor.

7. The apparatus as claimed in claim 5, wherein a resistance value ratio of the first resistor to the third resistor is the same as a resistance value ratio of the second resistor to the fourth resistor.

* * * * *